No. 646,149. Patented Mar. 27, 1900.
J. LANGTON.
METHOD OF PROTECTING ELECTRICAL CONNECTIONS.
(Application filed June 21, 1899.)
(No Model.)
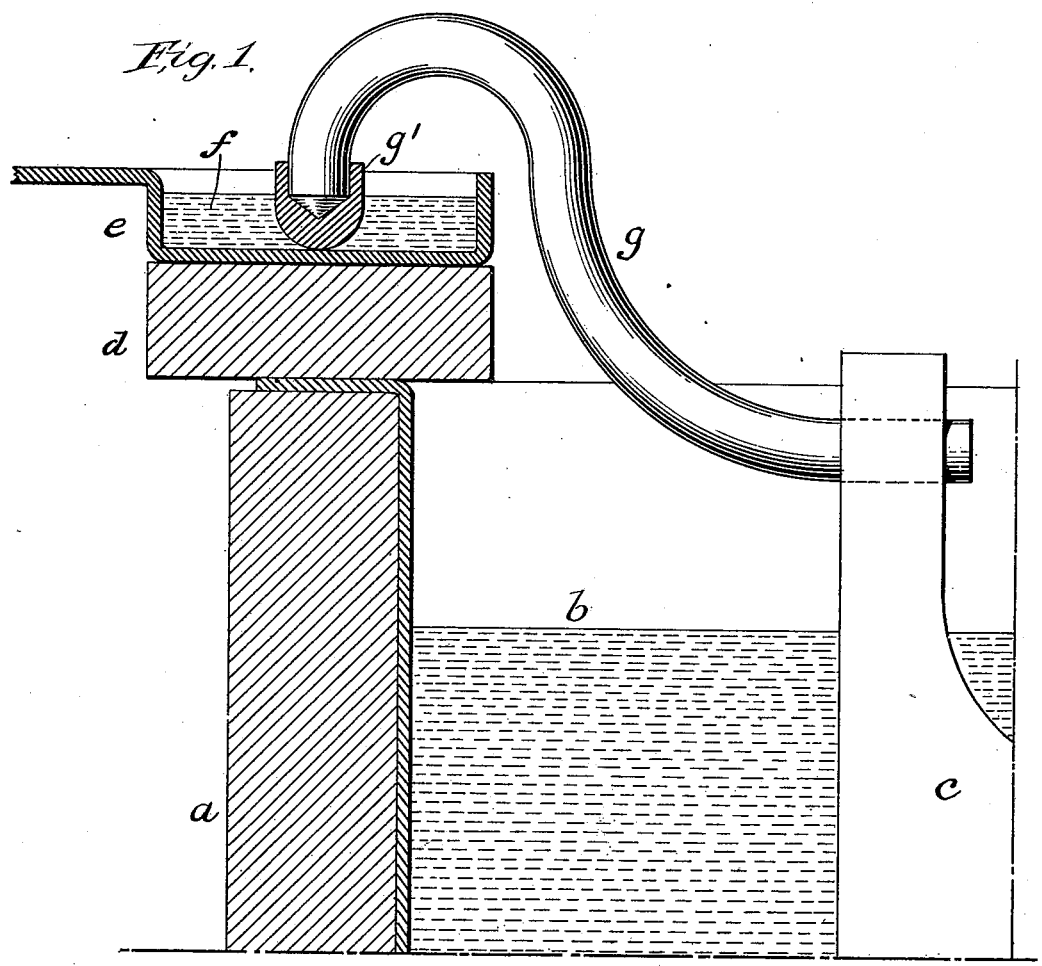
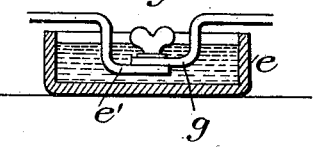
WITNESSES:
Frank S. Ober
Geo. S. Kennedy.
INVENTOR
John Langton
BY
Wm. H. Rosenbaum
ATTORNEY

UNITED STATES PATENT OFFICE.

JOHN LANGTON, OF NEW YORK, N. Y.

METHOD OF PROTECTING ELECTRICAL CONNECTIONS.

SPECIFICATION forming part of Letters Patent No. 646,149, dated March 27, 1900.

Application filed June 21, 1899. Serial No. 721,304. (No specimens.)

*To all whom it may concern:*

Be it known that I, JOHN LANGTON, a subject of the Queen of Great Britain, residing at the city of New York, in the borough of Manhattan and State of New York, have invented certain new and useful Improvements in Methods of Protecting Electrical Connections, of which the following is a full, clear, and exact description.

This invention is a method of protecting electrical connections, especially those connections which are exposed to drippings, splashings, sprayings, or a vapor-charged atmosphere, such as is the case with the connections of chemical generators and electrolytic cells. It is a well-known fact that the exposed parts of a battery or electrolytic cell soon become corroded or covered with the salts deposited thereon by the vapors and splashings from the cell and that these salts often so fully cover the contact-surfaces of the connecting-lugs and line-terminals that any relative movement of the contacts would bring them in touch with such covered surfaces and so impair the conductivity of the connection.

To avoid this impairment of contacts is the object of my invention; and it consists, broadly, in a method of protecting electrical connections from salts which would ordinarily be deposited thereon, which consists in dissolving said salts and holding them in solution.

In the accompanying drawings, Figure 1 is a sectional view of a portion of an electrolytic tank, showing a connection made and protected in accordance with my invention; and Fig. 2 illustrates a modification of the invention.

Referring to the drawings by letter, $a$ represents a part of a tank containing an electrolyte $b$ and one of the electrodes $c$, the other electrode not being shown. Upon the edge of the cell a bar $d$, of wood or other insulating substance, rests, and upon this is fixed a tray $e$, of copper or other suitable conducting material. This tray is the permanent terminal of one of the line conductors. It contains a quantity of water $f$ or some other liquid capable of dissolving and holding in solution any salts that may be deposited into it either from drippings, creepings, splashings, a vapor-charged atmosphere, or other source. The electrode $c$ is provided with the connecting-lug $g$, the free end of which in this instance is suitably bent to pass over the edge of tray $e$ and into the liquid contained therein. The end of the lug, which may or may not be provided with a suitable contacting shoe $g'$, rests in mechanical contact with the bottom of the tray, the contacting points being thus submerged and surrounded by the liquid in the tray. The best liquid I have discovered so far for this purpose is water; but any liquid that will serve the purpose may be used, a poorly-conducting or non-conducting liquid being preferred. It is found in practice and it will be obvious at once that the drippings, splashings, sprayings, or vapors from any source that are charged with salts when falling into the liquid $f$ are dissolved thereby and held in solution and prevented from being deposited upon or attacking the contact-surfaces of or the surfaces adjacent to the connections. The liquid $f$ may from time to time be drawn off or renewed to prevent saturation and deposits. While I have illustrated the tray $e$ as the terminal of the line-circuit, it is obvious that this tray may be of insulating material and that the terminal of the circuit may be led into the liquid in the same way as is done with the lug $g$, the connection being made beneath the surface of the liquid, as shown in Fig. 2, the two terminals being indicated by $e'$ $g$. Likewise other forms of connection may be adopted so long as the contacting surfaces are submerged in a liquid having the qualities hereinbefore mentioned.

My invention, broadly considered, comprehends the protecting of an electrical connection whether it be at the pole of a battery or electrolytic cell or elsewhere.

Having described my invention, I claim—

The method of protecting electrical connections which are exposed to salts from any source, which consists in immersing the connection in a liquid capable of dissolving said salts, and holding the liquid around the connection to prevent deposit upon or adjacent to the contact-surfaces of the connection.

In witness whereof I subscribe my signature in presence of two witnesses.

JOHN LANGTON.

Witnesses:
WM. A. ROSENBAUM,
GEO. S. KENNEDY.